United States Patent [19]

Reback

[11] Patent Number: 4,794,945
[45] Date of Patent: Jan. 3, 1989

[54] VALVE HANDLE ADAPTOR KIT

[76] Inventor: Richard L. Reback, 5649 Sorrento Dr., Long Beach, Calif. 90803

[21] Appl. No.: 167,502

[22] Filed: Mar. 14, 1988

[51] Int. Cl.$^4$ .................... F16K 43/00; F16K 31/60
[52] U.S. Cl. ........................... 137/315; 16/121; 74/553; 251/291; 403/361
[58] Field of Search ............... 74/553; 16/121; 137/315; 251/291; 403/361, 383

[56] References Cited

U.S. PATENT DOCUMENTS

| | | |
|---|---|---|
| 400,944 | 4/1889 | Powell . |
| 796,111 | 8/1905 | Canfield . |
| 999,332 | 8/1911 | Mueller . |
| 1,281,335 | 10/1918 | Fraser .................... 137/360 |
| 1,491,077 | 4/1924 | Beerworth . |
| 2,708,449 | 5/1955 | Keithley . |
| 2,896,222 | 7/1959 | Freibott . |
| 2,966,924 | 1/1961 | Young .................... 137/359 |
| 2,992,437 | 7/1961 | Nelson et al. . |
| 3,043,330 | 7/1962 | Young .................... 137/359 |
| 3,067,436 | 12/1962 | Freibott . |
| 3,331,386 | 7/1967 | Politz .................... 137/359 |
| 3,376,888 | 4/1968 | Anthony .................... 137/359 |
| 3,582,116 | 6/1971 | Young .................... 251/293 |
| 3,994,608 | 11/1976 | Swiderski et al. .................... 16/121 |
| 4,000,539 | 1/1977 | Neyer .................... 16/121 |
| 4,065,216 | 12/1977 | Nelson .................... 16/121 |
| 4,240,462 | 12/1980 | Bankstahl .................... 137/377 |
| 4,266,320 | 5/1981 | Grant .................... 251/293 |
| 4,337,860 | 7/1982 | Carrigan .................... 403/361 |
| 4,346,735 | 8/1982 | Raz .................... 137/801 |
| 4,531,272 | 7/1985 | Cohen .................... 137/315 |
| 4,616,673 | 10/1986 | Bondar .................... 137/315 |
| 4,678,002 | 7/1987 | Valley .................... 137/315 |

FOREIGN PATENT DOCUMENTS

| 248057 | 4/1963 | Australia .................... 137/360 |
|---|---|---|
| 1488651 | 10/1977 | United Kingdom .................... 403/361 |

Primary Examiner—George L. Walton
Attorney, Agent, or Firm—Fulwider, Patton, Rieber, Lee & Utecht

[57] ABSTRACT

The valve handle adaptor kit for use with a conventional handle and escutcheon, such kit including an adaptor formed on one end with a shank configured for complemental telescopical receipt in a socket formed in the handle and formed on its opposite extremity with an adaptor socket. A plurality of spuds are formed with external configurations for complemental receipt in either the spud socket or adaptor socket, such that the handle may be mounted directly from a valve stem through such spud, or through the adaptor by inserting the shank in the spud socket and a spud in the adaptor socket for receipt over a broach formed in the end of the valve stem.

10 Claims, 1 Drawing Sheet

VALVE HANDLE ADAPTOR KIT

BACKGROUND OF THE INVENTION

1. Field of the Invention

The present invention relates to a device for adapting a valve handle for mounting from selected ones of different valve stems which project different distances from the front surfaces of respective walls behind which the valve plumbing is disposed.

2. Description of the Prior Art

Valves of the type utilized to control water flow to shower heads and tub faucet spouts are typically housed in valve bodies disposed behind the shower wall, the extremity of the stem projecting a distance from the front surface of the wall determined by the location of the plumbing relative to the wall, the length of the valve stem and the overall wall thickness, including any tile or covering on such wall. There have been established no generally accepted set of standards in the plumbing industry for setting the length or configuration of valve stems, distance valve stems project from the wall upon installation or even configuration of the broach at the end of the valve stem. Thus, when a valve stem or valve itself becomes damaged necessitating replacement thereof, it is not unusual that the local plumbing store does not stock the particular style of stem incorporated in the original valve. This is particularly true for older plumbing wherein the manufacturer may have discontinued production or totally changed its design. Likewise, there is no generally accepted standards for handle configuration thus frequently requiring the handle and stem to be replaced as a unit in order to mate the handle with the new stem. This then often leads to the replacement of both the hot and cold handles such that the resultant installation will exhibit handles of the same design to thus present an aesthetically pleasing appearance.

Thus, there exists a need for a faucet adaptor which will adapt a handle for mounting on valve stems of various configurations and which will accommodate stems which are installed with various different degrees of projection and which will present an aesthetic appearance upon installation.

Various efforts have been made to solve these problems in the past. One such effort led to the proposal of an escutcheon for surrounding the bonnet of a valve projecting through the wall and formed on its free extremity with a hexogonal socket for receipt of a complementally formed boss included in a tube intended for mounting to project in one direction or the other from the extremity of the escutcheon. The sleeve is internally threaded for screwing onto the valve nipple. A device of this type is shown in U.S. Pat. No. 3,376,888 to Anthony. Devices of this type, while satisfactory for their intended purpose, suffer the shortcoming that their adaptation to various installations is extremely limited. That is, different shroud tubes must be stocked for each particular size of valve nipple and the construction of the tube and escutcheon is relatively complex and thus expensive to manufacture.

Other efforts have led to the proposal of a plurality of stem extensions constructed of different lengths and configurations. These extenders are formed on one end with a boss defining a broach socket for receipt over the broach at the end of a valve stem and formed on their opposite ends with a broach for direct receipt in the broach socket of a handle. A device of this type is shown in U.S. Pat. No. 3,582,116 to Young. Such extenders, while satisfactory for limited usage, suffer the shortcoming that they only have limited application, and are typically dedicated to the design of a specific manufacturer, thus requiring stocking of stem extenders of numerous different socket configurations and lengths in order to accommodate various configurations of installation. It has proven relatively impractical for a retailer to stock a sufficient supply of the numerous various configurations to make use practical. Also, the expense of manufacturing and stocking a full set of extenders is considerable. Furthermore, a do-it-yourselfer visiting his local retailer is faced with the problem of endeavoring to select the specific length and configuration of adaptor for his particular installation and with the dilemma that failure to purchase a sufficient number of configurations of extenders to enable a realistic trial and error installation will typically lead to another trip to the plumbing store to purchase further configurations or, at least, to return those particular extenders which his trial and error efforts proved were unsatisfactory for the installation.

Other efforts have led to the proposal that specially designed faucet handles be formed on their interior with hexogonal sockets for receipt of respective hexogonal nuts formed on the respective one ends of respective differently sized and configured adaptors. A device of this type is shown in U.S. Pat. No. 4,616,673 to Bondar. Such a device, while providing adaptation of a handle of special design to various installations, suffers the shortcoming of failing to provide for accommodation of handles of conventional design and in requiring stocking of a great number of relatively expensive adaptors in order to accommodate the large variety of stems and handles currently on the market and in use in the field.

Thus, an object of the present invention is to provide a faucet handle adaptor which is configured for use with conventional handles and which is itself adaptable to mounting on valve stem broaches of numerous different configurations.

SUMMARY OF THE INVENTION

The valve handle adaptor of the present invention is characterized by an elongated adaptor formed on one end with a shank configured for complemental receipt in a spud socket formed in a conventional handle and formed on its opposite end with an adaptor socket for receipt of selected ones of a set of spuds each of which are formed with differently sized broach sockets configured for receipt of broaches of selected different configurations.

Other objects and features of the invention will become apparent from consideration of the following description taken in connection with the accompanying drawing.

DESCRIPTION OF THE PREFERRED EMBODIMENT

Figure 1:
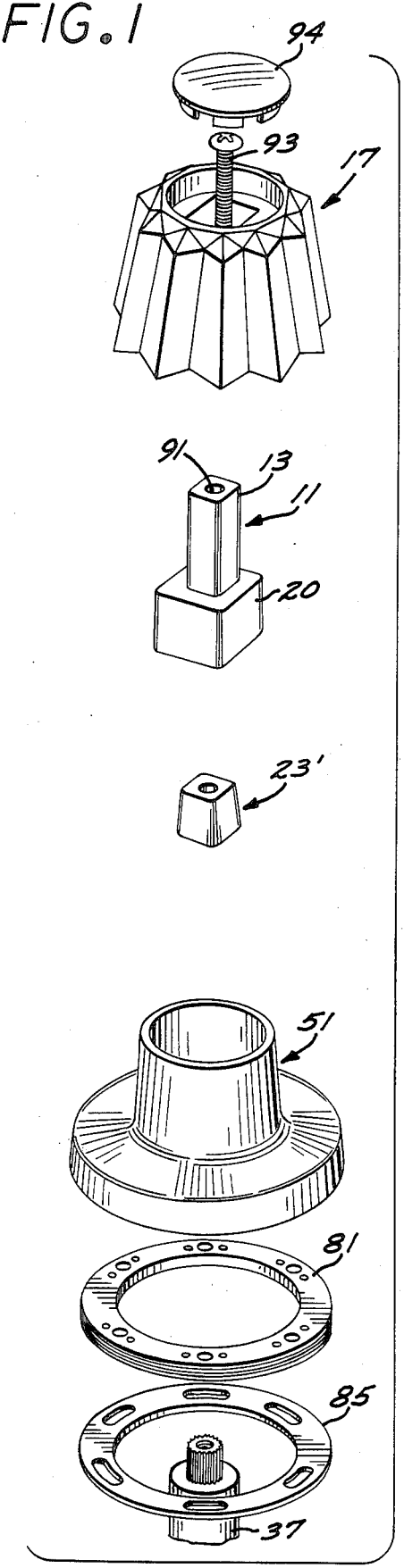
FIG. 1 is an exploded perspective view of a faucet handle and escutcheon assembly incorporating the handle adaptor of the present invention.
Figure 3:
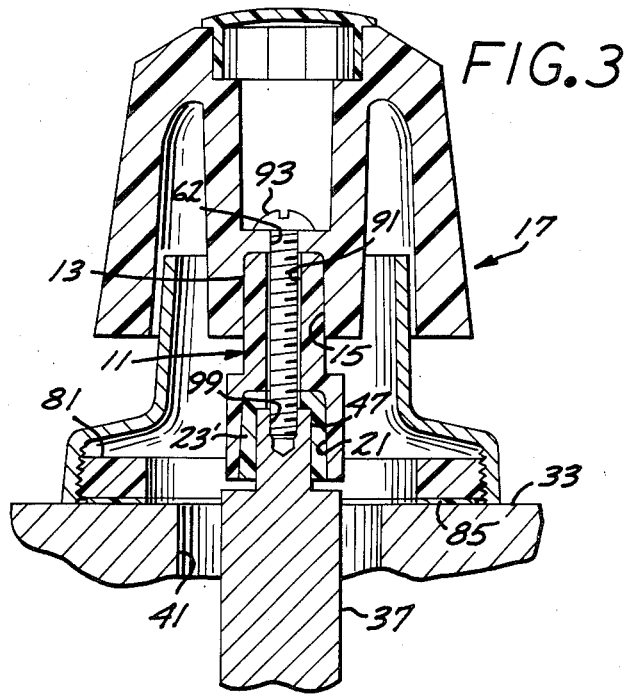
FIG. 3 is a longitudinal sectional view of a faucet and escutcheon assembly similar to that shown in FIG. 2 but with the handle adaptor installed.
Figure 4:
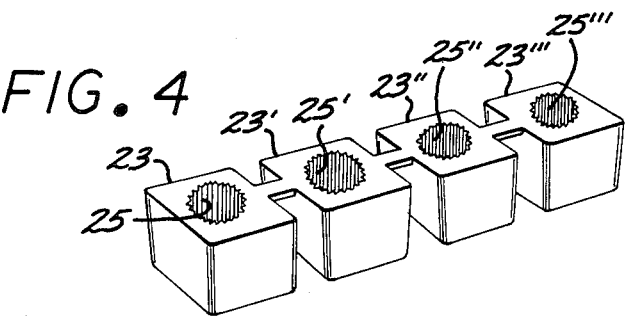
FIG. 4 is a perspective view in enlarged scale of spuds which may be utilized in the faucet adaptor kit of the present invention.

Referring to FIGS. 1 and 3, the faucet adaptor kit of the present invention includes an adaptor, generally designed 11, formed on one end with a shank 13 which is square in cross section for selective receipt in a square open ended pocket 15 formed in a handle, generally designated 17. The opposite end of the adaptor 11 is enlarged in cross section and is formed with an axially opening adaptor socket 21 (FIG. 3) for selective receipt of selective ones of conventional spuds 23-23''', each of which have different sized broach sockets 25-25'''.

Figure 2:
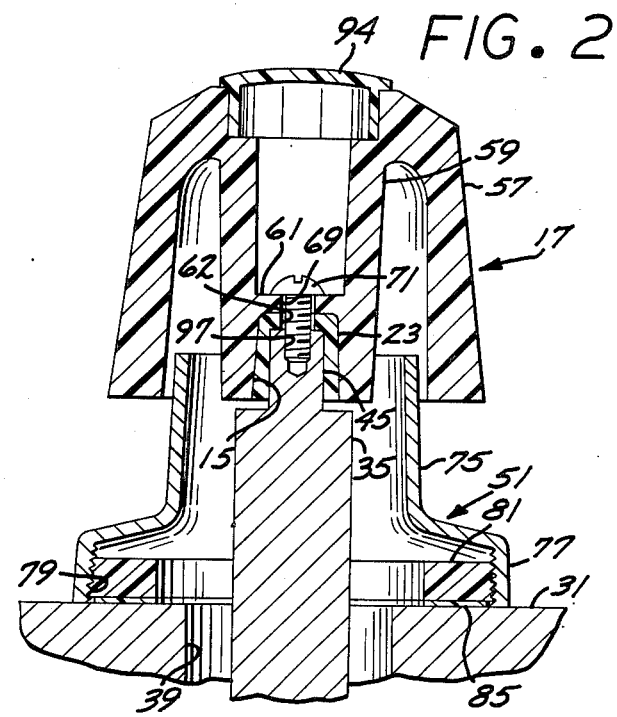
FIG. 2 is a longitudinal sectional view of a faucet handle and escutcheon similar to that shown in FIG. 1 but in enlarged scale.

In the plumbing industry it is common practice to mount the plumbing for a valve, such as a shower valve, behind a wall 31 or 33 and to then project a valve stem 35 or 37 (FIGS. 2 and 3) through a respective opening 39 or 41 in the wall for receipt of a handle 17. The stem is typically rotated by the handle 17 to advance and retract the stem relative to the valve body (not shown) to thus open and close the valve itself. Typically, the valve stems project from the front surface of the walls 31 or 33 a distance dictated by the location of the plumbing relative to the wall itself and the thickness of the wall. Additionally, such stems are often made by numerous different manufacturers and, there being no industry standard, are frequently of different sizes and are formed on their projecting ends with splined broaches 45 and 47 which may be of different diameters.

Conventional plumbing fixtures also typically incorporate escutcheons somewhat similar to the escutcheon, generally designated 51, but which thread onto the bonnet (not shown) of the valve to thus provide a shroud over the stem 35 or 37 to conceal the stem from view and thus enhance the aesthetic appearance of the plumbing fixture. The problem attendant replacement of the escutcheons which may be of numerous different sizes and configurations is addressed in my co-pending patent application, Ser. No. 07/029,137, and now U.S. Pat. No. 4,739,788, so will not be repeated here. However, there still exists the problem that when a valve stem is to be replaced and a new handle is required or a new handle is to be substituted for an existing handle, the fit of the handle relative to the valve stem and escutcheon poses a particular problem. That is, the handle must be mounted on a stem which spaces it a sufficient distance axially outwardly from the wall 31 or 33 to accommodate the length of escutcheon employed while providing full shrouding of the stem and accommodating full axial travel of such stem for full opening and closure of the valve. My invention involves a relatively inexpensive and straightforward apparatus for achieving this result.

Handle 17 is of a generally conventional construction incorporating a peripheral cylindrically shaped skirt 57 which flares outwardly in a frusto conical manner. Such handle includes a central axially extending cylindrical boss 59 formed medially with a transverse wall 61 and formed on the distal side of such wall with a square in cross section spud pocket 65. The medial wall 61 has a bore 69 formed therein for receipt of a fastening screw 71.

The kit of the present invention includes a plurality of spuds 23-23''' having uniform square cross sections, each formed with respective splined bores or sockets 25-25''' having different internal diameters for accommodating different diameter broaches 45 and 47. The respective spuds are formed at the blind ends of their respective sockets 25-25''' with through bores 62.

The escutcheon 51 is fully described in my co-pending patent application mentioned hereinabove so will be only described herein in a general context. The escutcheon 51 is formed with a main cylindrical barrel 75 which serves to shroud the main portion of the stem 35 or 37 and then flares outwardly to form an enlarged in diameter base 77 which is threaded on its interior surface at 79 for screwing onto a mounting ring 81 which is bonded onto the wall 31 or 33 by means of a bonding ring 85.

The adaptor 11 is preferably constructed of hard plastic, such as that sold under the name Delrin, Celcon or Lexan, and may be on the order of 1½" to 2" long. In some instances, kits may be provided with different length adaptors 11. The shank 13 is formed with a square exterior cross section of a size which telescopically slip fits into the spud socket 65 of a handle 17. The adaptor 11 is formed with an axial fastener bore 91 for telescopical receipt of a long fastener screw 93 (FIG. 3).

Stems 35 and 37 are typically formed with broaches having fairly standard sized threaded fastening bores 97 or 99 for receipt of fastening screws comparable to the fastening screws 71 or 93.

In practice a faucet adaptor kit typically incorporates a handle 17, at least a pair of fastening screws 71 and 93 of different lengths, the adaptor 11, and possibly on the order of 12 spuds 23-23''' having the spud sockets 25-25''' of various different sizes.

Thus, a do-it-yourselfer or professional plumber preparing to install a new handle 17 or a new stem 35 or 37, which will require a new handle, may select an adaptor handle kit, remove the old handle and, if necessary, replace the valve stem. The adaptor kit may be utilized with a conventional escutcheon or the particular escutcheon 51 described herein. With the escutcheon 51, the old escutcheon may be removed and discarded. The escutcheon 51 may be easily installed by bonding the mounting ring 81 to the wall 31 or 33 in concentric relationship about the respective stem 35 or 37. The escutcheon 51 may then be screwed onto the mounting ring 81 to mount the escutcheon from the wall 31 or 33.

It will be appreciated that for stems 35 arranged in positions to project a relatively great distance from the wall 31 (FIG. 2) there is sufficient reach in the stem itself to accommodate mounting of the faucet handle 17 directly thereto. In these instances, a spud 23-23''' may be selected having the splined bore 25-25''' corresponding with the configuration of the broach 45 and inserted in the pocket 15 of the handle 17. The handle may then be positioned on the broach 45 by telescoping the spud 23 over such broach and the relatively short fastening screw 71 inserted through the bores 69 and 62 to fasten the handle 17 in place on the stem 35. A cover plate 94 may then be snapped into covering position over the screw head and the handle 17 is then ready for rotation of the stem 35 in operation of the valve (not shown).

For other configurations wherein the stem 37 projects only a short distance from the front surface of the wall 33 or even fails to project flush thereto, it will be appreciated that there is insufficient reach to enable the valve handle 17 to be mounted directly thereto while providing for full axial travel of the stem. In this instance, the adaptor 11 is selected and the shank 13 inserted in the pocket 15 and a spud 23' selected with a spline bore 25' having a configuration for receipt of the broach 47. The longer fastening screw 93 may then be inserted through the bore 69 and telescoped through the bore 91 of the adaptor to be threaded into the threaded fastening bore 99 of the broach 47 to secure the handle 17 in position mounted on the valve stem 37. It will be appreciated that with the described kit, there are a great number of combinations of adaptors 11 and spuds 23-23''' which may be assembled to accommodate a great number of stem configurations and orientations. In fact, the spuds 23-23'' may be constructed of relatively inexpensive plastic costing on the order of just several pennies apiece, thus making it practical to, after the handle 17 has been installed, discard the remaining spuds. This arrangement eliminates the necessity of stocking numerous different length valve stems or stocking numerous different length, sizes and configurations of valve stem adaptors which would otherwise be required for different sizes and combinations of valves stems and configurations thereof.

From the foregoing it will be apparent that the valve handle adaptor of the present invention provides a highly flexible means for mounting a standard handle from numerous different shapes and configurations of valve stems, a kit which is economical to manufacture and convenient to use.

Various modifications and changes may be made with regard to the foregoing detailed description without departing from the spirit of the invention.

I claim:

1. A valve handle adaptor kit for mounting a handle on selected ones of a plurality of faucet stems, each formed with broaches of selected different configurations, such handle being of the type including a central, axially projecting boss formed with an open ended multisided handle pocket and a central axial bore leading to such handle pocket, such kit comprising:
   an elongated handle adaptor formed at one extremity with an elongated multisided shank shaped to be complementally received in such handle pocket and formed at its opposite extremity with an axially opening multisided spud-receiving adaptor socket configured to correspond with such handle pocket, said adaptor being further formed with an axial fastener-receiving bore;
   a plurality of interchangeable spuds, forming a set of spuds formed with common exterior multisided cross sectional configurations for being complementally and selectively received in such handle pocket or, alternatively in said adaptor socket, each spud being formed with respective open ended broach sockets of selected different cross sectional configurations formed for complemental receipt on selected ones of such valve stem broaches, said spuds further being formed with through axial bores arranged and disposed to be aligned with said fastener-receiving bore;
   a plurality of fastener screws, one sized for receipt through said central axial bore in such handle boss to be screwed into said threaded bore in one of said broaches and another being sized for receipt through said central axial bore in said handle boss and through said fastener-receiving bore in said adaptor to be screwed into the threaded bore of another of such broaches whereby, said spuds may be inserted interchangeably in either such handle pocket or said adaptor socket so that such handle may be mounted directly from a first selected valve stem broach by inserting a selected spud of such set of spuds in such handle pocket and fitting it directly on such selected valve stem broach or, in the alternative, such handle may be mounted in spaced relation to a second selected valve stem broach by inserting said shank of said adaptor in said handle pocket, inserting a desired spud or such selected spud of such set of spuds in said adaptor socket and then fitting such desired or selected spud over such second valve stem broach.

2. A faucet handle repair kit as set forth in claim 1 for use in mounting a handle formed with a spud socket which is square in cross section and wherein:
   said shank of said adaptor is square in cross section.

3. A faucet handle repair kit as set forth in claim 1 wherein:
   said adaptor is constructed of plastic.

4. A valve handle repair kit as set forth in claim 1 for use with an escutcheon formed with a barrel for projecting away from the wall from which a predetermined valve stem projects to terminate in an extremity end spaced a predetermined distance from such wall and with a handle of the type formed with a peripheral skirt configured to telescope over the free extremity of such barrel and wherein:
   said adaptor is of sufficient length to, when mounting such handle from such predetermined valve stem, with such escutcheon mounted on such wall, dispose such skirt in telescopical, overlapping relationship with such extremity of such barrel.

5. A valve handle repair kit as set forth in claim 2 wherein:
   said spuds are square in external cross section.

6. A valve handle adaptor kit for mounting a faucet handle of the type formed with a central boss defining an open ended spud-receiving handle pocket of a predetermined multisided internal cross sectional configuration, from selected ones of a set of faucet stems projecting different distances from respective walls and formed at their respective free extremities with broaches having predetermined different cross sectional broach configurations, said kit comprising:
   an elongated faucet adaptor including on one extremity, an elongated shank having an external multisided cross sectional configuration formed for complemental telescopical receipt in such open ended handle pocket and formed on its opposite extremity with an open ended adaptor socket having an internal multisided cross sectional configuration corresponding with that of such handle pocket;
   a set of interchangeable spuds formed with multisided external configurations corresponding with that of such handle pocket and adaptor socket for complemental interchangeable receipt in either said handle pocket or said adaptor socket, said spuds being formed with respective open ended broach sockets, said broach sockets being formed with respective internal cross sectional configurations corresponding with the cross sectional configuration of the respective broaches of such faucet stems; and
   fastening means for selectively fastening such handle and a selected spud to a selected one of such broaches or, in the alternative, to fasten such handle to said shank of said adaptor and said adaptor to a selected broach whereby a spud may be selected from said set of spuds having a broach socket configuration of the stem on which such handle is to be mounted and such spud so selected then inserted in said spud pocket for mounting said handle from a stem projecting one distance from a wall and said fastening means installed to hold said handle in place or, in the alternative, for a shorter stem projecting a distance less than said predetermined distance from a wall, a spud having a broach socket of a selected configuration for fitting the broach of such shorter stem selected from said set of broaches and inserted in said adaptor socket, said stem of said adaptor inserted in said spud socket for mounting said handle on such shorter stem and said fastening means inserted to hold said handle and adaptor in position.

7. A valve handle adaptor kit as set forth in claim 6 for use with stem broaches formed with threaded mounting bores and wherein:
said adaptor and spuds are formed with axial bores and wherein:
said fastening means includes screws for receipt in said bores.

8. A valve handle adaptor kit as set forth in claim 6 wherein:
said adaptor is constructed of plastic.

9. A valve handle adaptor kit as set forth in claim 6 for use in mounting a handle formed with a spud pocket which is square in cross section and wherein;
said shank of said adaptor is square in cross section.

10. A valve handle adaptor kit as set forth in claim 6 for use with an escutcheon of a predetermined length and a faucet of the type formed with a peripheral skirt configured to telescoped over the free extremity of said escutcheon and wherein:
said adaptor is formed of sufficient length to, when employed to mount said handle from one of said stems, dispose said skirt in telescopical overlapping relationship relative to such free end of such escutcheon.

* * * * *